United States Patent
Nomura et al.

(10) Patent No.: US 10,688,745 B2
(45) Date of Patent: Jun. 23, 2020

(54) WINDING METHOD AND WINDING DEVICE FOR BEAD FILLER FOR TIRE

(71) Applicants: FUJI SEIKO CO., LTD., Hashima-Shi, Gifu-Ken (JP); FUJI SHOJI CO., LTD., Hashima-Shi, Gifu-Ken (JP)

(72) Inventors: Shigeaki Nomura, Hashima (JP); Akira Seko, Hashima (JP)

(73) Assignees: FUJI SEIKO CO., LTD. (JP); FUJI SHOJI CO., LTD. (JP)

(*) Notice: Subject to any disclaimer, the term of this patent is extended or adjusted under 35 U.S.C. 154(b) by 290 days.

(21) Appl. No.: 15/122,054

(22) PCT Filed: Mar. 24, 2014

(86) PCT No.: PCT/JP2014/057959
§ 371 (c)(1),
(2) Date: Aug. 26, 2016

(87) PCT Pub. No.: WO2015/145519
PCT Pub. Date: Oct. 1, 2015

(65) Prior Publication Data
US 2017/0015076 A1 Jan. 19, 2017

(51) Int. Cl.
*B29D 30/44* (2006.01)
*B29D 30/48* (2006.01)
(Continued)

(52) U.S. Cl.
CPC ......... *B29D 30/44* (2013.01); *B29D 30/3007* (2013.01); *B29D 30/48* (2013.01);
(Continued)

(58) Field of Classification Search
CPC .... B29D 30/30; B29D 30/3007; B29D 30/44; B29D 30/48; B29D 2030/4425;
(Continued)

(56) References Cited

U.S. PATENT DOCUMENTS

| 4,226,663 | A | * | 10/1980 | Pirovano | B29D 30/48 156/422 |
| 4,933,034 | A | | 6/1990 | Kokubu et al. | |
| 4,994,136 | A | * | 2/1991 | Pizzorno | B29D 30/42 156/398 |

(Continued)

FOREIGN PATENT DOCUMENTS

| JP | 63-33924 U | 3/1988 |
| JP | 64-90736 A | 4/1989 |

(Continued)

OTHER PUBLICATIONS

Tsuda, JP 2002096401, machine translation. (Year: 2002).*

(Continued)

*Primary Examiner* — Robert C Dye
*Assistant Examiner* — Sedef E Paquette
(74) *Attorney, Agent, or Firm* — Tarolli, Sundheim, Covell & Tummino LLP

(57) ABSTRACT

A rubber strip is transported to a molding drum. At this stage, a cutter cuts the rubber strip into a predetermined length. If a sensor detects the finishing end of the rubber strip when the rubber strip is transported, a sucker, which transports the rubber strip while drawing the rubber strip, is temporarily stopped or the movement speed of the sucker is decreased. As a result, a top portion of the rubber strip is extended in the longitudinal direction of the rubber strip. This compensates for the amount of shrinkage of the rubber strip after extrusion, thus restraining shrinkage of the rubber strip.

3 Claims, 4 Drawing Sheets

(51) Int. Cl.
  *B29D 30/30* (2006.01)
  *B60C 15/06* (2006.01)

(52) U.S. Cl.
  CPC ...... *B60C 15/06* (2013.01); *B29D 2030/4425* (2013.01); *B29D 2030/482* (2013.01)

(58) Field of Classification Search
  CPC .... B29D 2030/4443; B29D 2030/4462; B29D 2030/4468; B29D 2030/4493; B29D 2030/481; B29D 2030/482; B60C 2015/061; B60C 2015/0696; B60C 15/06; B60C 15/0603
  USPC ............... 156/131, 136, 406.6, 422; 152/541
  See application file for complete search history.

(56) References Cited

U.S. PATENT DOCUMENTS

| | | | |
|---|---|---|---|
| 5,080,738 A | | 1/1992 | Araki et al. |
| 5,111,722 A | | 5/1992 | Tada et al. |
| 2009/0266474 A1 | * | 10/2009 | Matsuyama ........... B29D 30/48 156/136 |
| 2012/0111473 A1 | * | 5/2012 | Hasegawa ........... B29C 65/7847 156/64 |

FOREIGN PATENT DOCUMENTS

| | | | |
|---|---|---|---|
| JP | 2-62232 A | | 3/1990 |
| JP | H03166149 A | | 7/1991 |
| JP | 8-142227 A | | 6/1996 |
| JP | 2002-96401 A | | 4/2002 |
| JP | 2002-361757 A | | 12/2002 |
| JP | 2006272582 A | * | 10/2006 |
| JP | 2006281621 | | 10/2006 |
| JP | 2007130827 A | * | 5/2007 |

OTHER PUBLICATIONS

Nobuyuki Koike, JP-2007130827-A, machine translation. (Year: 2007).*

Hiroshi Uchida, JP-2006272582-A, machine translation. (Year: 2006).*

International Preliminary Report on Patentability for Application No. PCT/JP2014/057959 dated Mar. 24, 2014.

Notification of Reasons for Refusal for corresponding Japanese application No. 2016-509624, dated Dec. 19, 2017.

International Search Report for Application No. PCT/JP2014/057959 dated Jun. 10, 2014.

* cited by examiner

WINDING METHOD AND WINDING DEVICE FOR BEAD FILLER FOR TIRE

RELATED APPLICATIONS

The present invention is a U.S. National Stage under 35 USC 371 patent application, claiming priority to Serial No. PCT/JP2014/057959, filed on 24 Mar. 2014, the entirety of which is incorporated herein by reference.

TECHNICAL FIELD

The present invention relates to a winding method and a winding device for a bead filler (hereinafter, referred to simply as a filler) embedded in a bead portion of a tire containing air.

BACKGROUND ART

An annular bead filler is configured by winding a rubber strip having a triangular cross section, which has been extruded from an extruder and cut into a predetermined length, and joining the opposite ends of the rubber strip to each other (for example, Patent Document 1).

PRIOR ART DOCUMENT

Patent Document

Patent Document 1: Japanese Laid-Open Patent Publication No. 2002-361757

SUMMARY OF THE INVENTION

Problems That the Invention Is to Solve

After having been extruded from an extruder, a rubber strip cools down and shrinks as the time elapses. In this case, the rubber strip shrinks by a greater amount in a thin section, which cools down rapidly. Therefore, in the case of a rubber strip having a triangular cross section and a non-uniform thickness in the widthwise direction, the rubber strip shrinks more rapidly in the longitudinal direction of the rubber strip in a thin section of an end section in the widthwise direction than in a thick section. If, in this state, the opposite ends of the rubber strip, which have been cut into a predetermined length, are joined to each other, a gap may be formed between the opposite ends of the rubber strip or the joint strength between the ends of the rubber strip may become insufficient. This may cause an insufficient joint, thus lowering the quality of the filler.

Accordingly, it is an objective of the present invention to provide a winding method and a winding device capable of appropriately joining opposite ends of a rubber strip to each other and ensuring a high-quality filler.

Means for Solving the Problem

To solve the above-described problem, according to the present invention, provided is a winding method for a bead filler for a tire including winding a rubber strip of a predetermined length in an annular shape and joining opposite ends of the rubber strip to each other. By this method, prior to the joining of the opposite ends of the rubber strip, at least one of the ends of the rubber strip is extended.

In this manner, shrinkage of an end section of a thin section of the rubber strip is restrained and a high-accuracy annular filler is obtained.

To limit a decrease of the length, it is preferable to hold at least one of the opposite ends of the rubber strip by drawing the end and pulling and extending the held end section of the rubber strip in the direction opposite to the transport direction of the rubber strip.

Effect of the Invention

According to the present invention, a high-accuracy filler is molded.

MODE FOR CARRYING OUT THE INVENTION

An embodiment of a winding method and a winding device for a bead filler for a tire will now be described.

Figure 1:
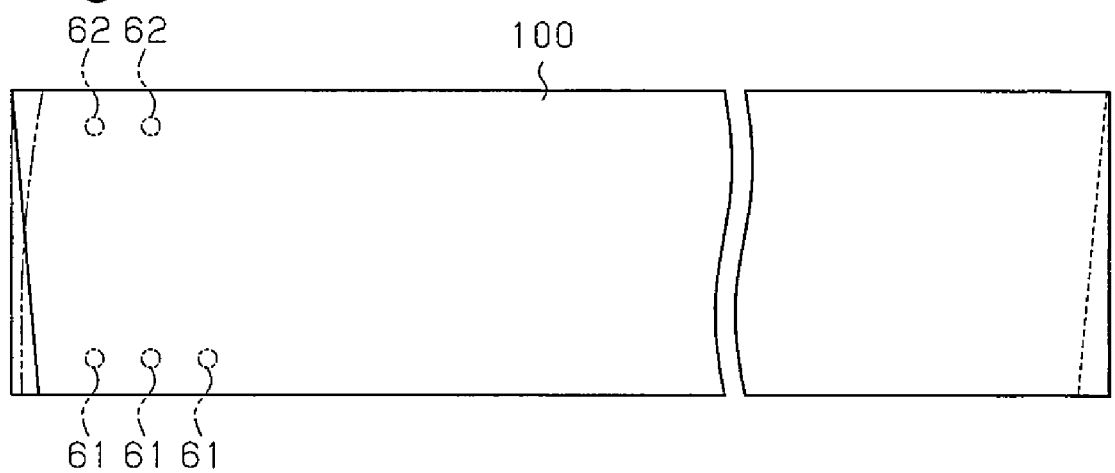
FIG. 1 is a partially omitted plan view showing a rubber strip.
Figure 2:
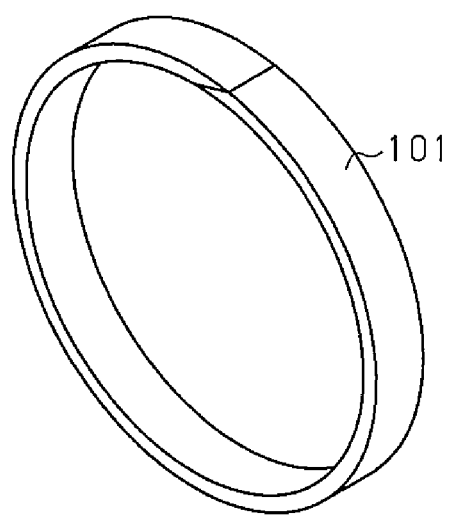
FIG. 2 is a perspective view showing a filler.
Figure 3:
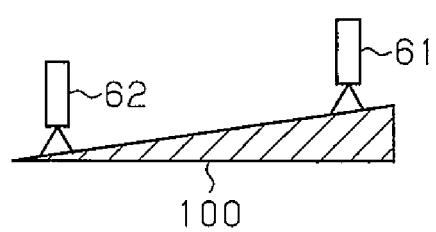
FIG. 3 is a cross-sectional view representing the relationship between the rubber strip and suckers.

As shown in FIG. 1, a rubber strip 100 is formed by being extruded from a non-illustrated extruder and cut into a predetermined length. With reference to FIG. 2, an annular filler 101 is formed by winding the rubber strip 100 and joining opposite ends of the rubber strip 100 to each other. As illustrated in FIG. 3, the rubber strip 100 and the filler 101 both have a flattened triangular cross section. Hereinafter, a thick section of the rubber strip 100 will be referred to as a base portion and a thin section of the rubber strip 100 will be referred to as a top portion.

A winding device for molding the filler 101 by winding the rubber strip 100 will hereafter be described.

With reference to FIGS. 4 to 10, a molding drum 21 is rotatable about a horizontal drum shaft 22 and rotated by a non-illustrated drive motor in the counterclockwise direction as viewed in the drawings. A drawing portion 23 using vacuum is arranged in an outer peripheral surface of the molding drum 21. A starting end (the left end as viewed in FIGS. 4 to 10) of the rubber strip 100 is drawn to the outer peripheral surface of the molding drum 21 by means of the drawing portion 23. In this state, by rotating the molding drum 21 in the counterclockwise direction of FIGS. 4 to 10, the rubber strip 100 is wound around the outer peripheral surface of the molding drum 21 and thus molded in an annular shape.

A first conveyor 31 serving as a main transport member is arranged in the vicinity of the molding drum 21. The first conveyor 31 transports the rubber strip 100 to the molding drum 21. A second conveyor 32 is arranged upstream from the first conveyor 31 with a slight clearance formed between the second conveyor 32 and the first conveyor 31. The second conveyor 32 transports the rubber strip 100 to the first conveyor 31.

A cutter 33 is arranged at a position between the first conveyor 31 and the second conveyor 32. The cutter 33 cuts the rubber strip 100 into a predetermined length in the clearance between the first conveyor 31 and the second conveyor 32.

Figure 4:
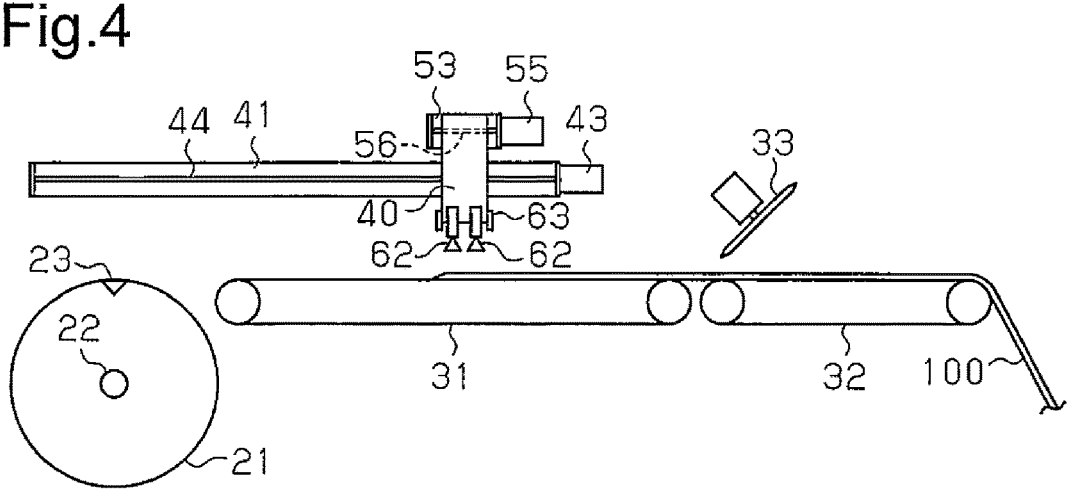
FIG. 4 is a schematic view representing an initial stage of a filler winding step.
Figure 5:
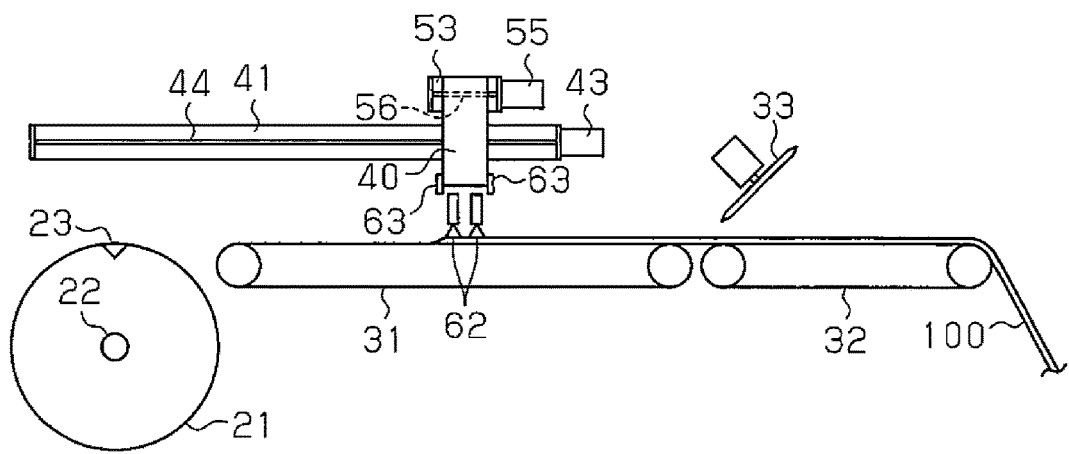
FIG. 5 is a schematic view representing a filler winding step following the step of FIG. 4.
Figure 11:
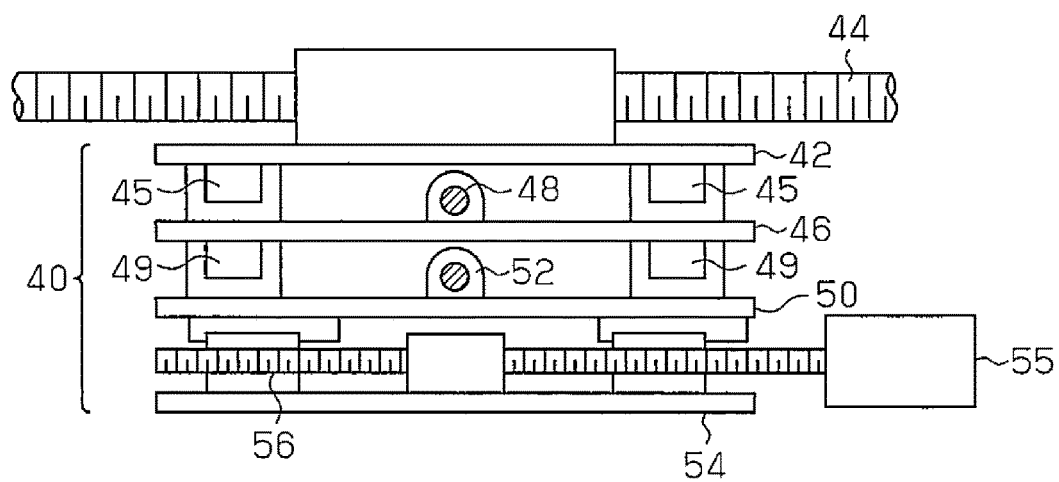
FIG. 11 is a schematic plan view showing a movable body unit.

A guide rail 41, which extends in the direction in which the rubber strip 100 is transported, is arranged above the molding drum 21 and the first conveyor 31. As shown in FIGS. 4 and 11, a movable body unit 40 is supported by the guide rail 41. The movable body unit 40 is reciprocated along the guide rail 41 in the transport direction of the rubber strip 100 through rotation of a feed screw 44, which is rotated by a motor 43.

The movable body unit 40 has a first movable body 42. The movable body 42 is guided by the guide rail 41. The feed screw 44 applies movement force to the first movable body 42.

As illustrated in FIG. 11, the first movable body 42 has guide rails 45, which extend in the up-and-down direction. The guide rails 45 support a second movable body 46. The second movable body 46 is selectively raised and lowered along the guide rails 45 by a feed screw 48, which is rotated by a non-illustrated motor. The second movable body 46 has guide rails 49, which extend in the up-and-down direction. The guide rails 49 support a third movable body 50. The third movable body 50 is selectively raised and lowered along the guide rails 49 by a feed screw 52, which is rotated by a non-illustrated motor 51. The third movable body 50 has a guide rail 53, which extends in the transport direction of the rubber strip 100. The guide rail 53 supports a fourth movable body 54. The fourth movable body 54 is reciprocated along the guide rail 53 in the aforementioned transport direction by a feed screw 56, which is rotated by a motor 55 supported by the third movable body 50.

Figure 12:
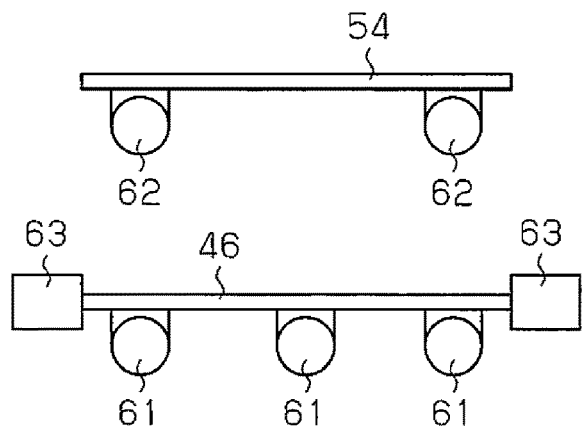
FIG. 12 is a schematic plan view showing suckers and sensors.

With reference to FIGS. 4 and 12, the second movable body 46 has three suckers 61, which are aligned in the transport direction of the rubber strip 100. Each of the suckers 61 is capable of drawing a side surface of the base portion of the rubber strip 100. The fourth movable body 54 has a pair of suckers 62, which are aligned in the aforementioned transport direction. Each of the suckers 62 is capable of drawing a side surface of the top portion of the rubber strip 100. The two suckers 62 configure an auxiliary transport member, together with the motor 43, which moves the movable body unit 40 in the aforementioned transport direction, and the feed screw 44.

As illustrated in FIG. 12, the second movable body 46 has a pair of sensors 63. The sensors 63 are aligned in the aforementioned transport direction.

A winding method using the winding device will hereafter be described.

Referring to FIG. 4, after having been extruded from a non-illustrated extruder, the rubber strip 100 is transported to the molding drum 21 by the first conveyor 31 and the second conveyor 32. At this stage, the movable body unit 40 is arranged at a middle position in the transport direction of the first conveyor 31. Meanwhile, the second movable body 46 is arranged at a raised position and the third and fourth movable bodies 50, 54 are also arranged each at a raised position. As the starting end of the rubber strip 100 reaches a position below the movable body unit 40, the left one of the sensors 63 detects the starting end of the rubber strip 100.

Figure 6:
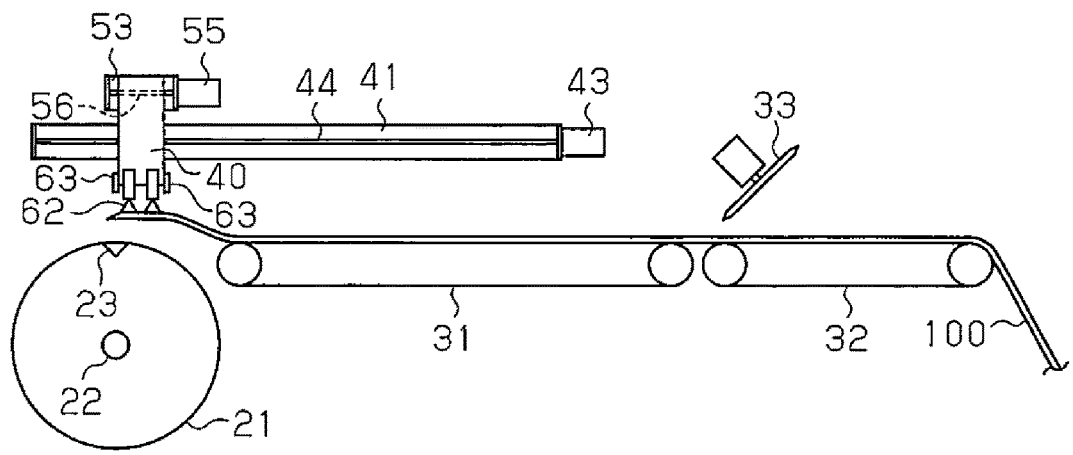
FIG. 6 is a schematic view representing a filler winding step following the step of FIG. 5.

In response to such detection, the second movable body 46 of the movable body unit 40 is lowered through rotation of the feed screw 48. The third and fourth movable bodies 50, 54 are thus lowered together with the second movable body 46. As a result, as is clear from FIGS. 5, 1, and 3, the suckers 61 and the suckers 62 come into contact with the side surface of the base portion and the side surface of the top portion, respectively, at the starting end of the rubber strip 100 such that the starting end of the rubber strip 100 is held by the drawing effects of the suckers 61, 62. In this state, by rotating the feed screw 48, the second movable body 46 is returned to the raised position, together with the third and fourth movable bodies 50, 54. Meanwhile, the movable body unit 40 is moved in the transport direction at the speed equal to the speed of the first conveyor 31 and the second conveyor 32. The rubber strip 100 is thus transported while being held by the suckers 61, 62. Then, as illustrated in FIG. 6, the starting end of the rubber strip 100 reaches a position above the drawing portion 23 of the molding drum 21.

Figure 7:
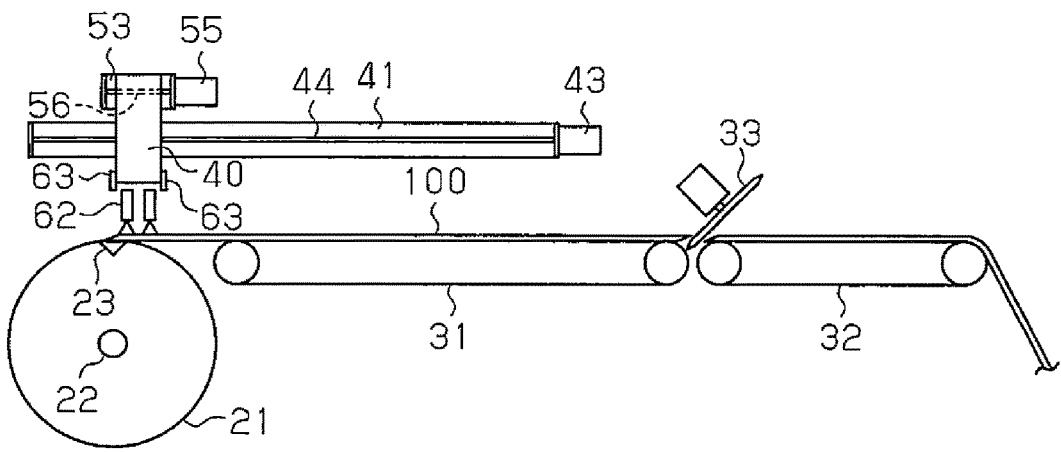
FIG. 7 is a schematic view representing a filler winding step following the step of FIG. 6.
Figure 8:
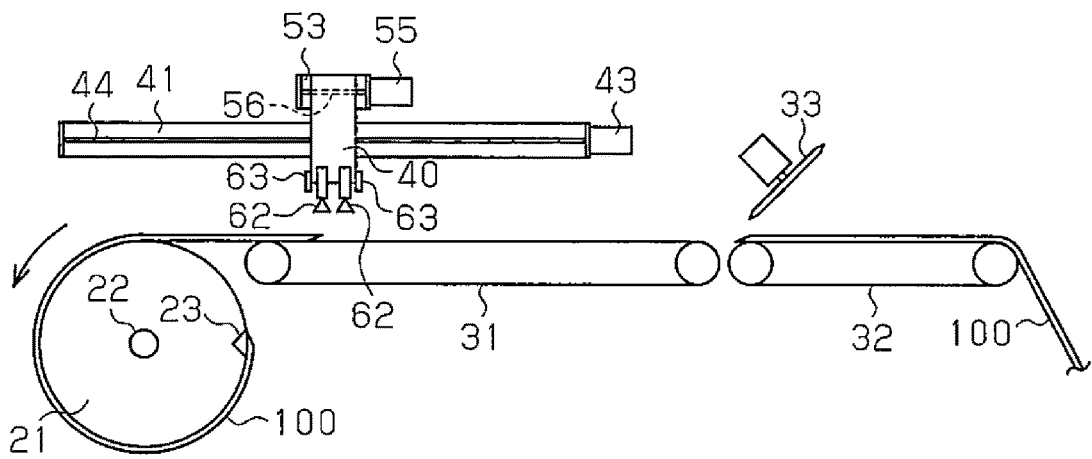
FIG. 8 is a schematic view representing a filler winding step following the step of FIG. 7.

Subsequently, with reference to FIG. 7, the second movable body 46 is lowered together with the third and fourth movable bodies 50, 54 to mount the starting end of the rubber strip 100 on the drawing portion 23 of the molding drum 21. Then, drawing by the suckers 61, 62 is stopped and drawing operation by the drawing portion 23 of the molding drum 21 is started. The starting end of the rubber strip 100 is thus held by the drawing portion 23. At this stage, the cutter 33 cuts the rubber strip 100 into a predetermined length.

Afterwards, the second movable body 46 is returned to the raised position, and the suckers 61, 62 are also returned each to the raised position. Subsequently, referring to FIG. 8, the movable body unit 40 is retracted to a downstream end section of the first conveyor 31. On the other hand, the molding drum 21 is rotated in the counterclockwise direction to transport and wind the rubber strip 100 around the outer peripheral surface of the molding drum 21.

Figure 9:
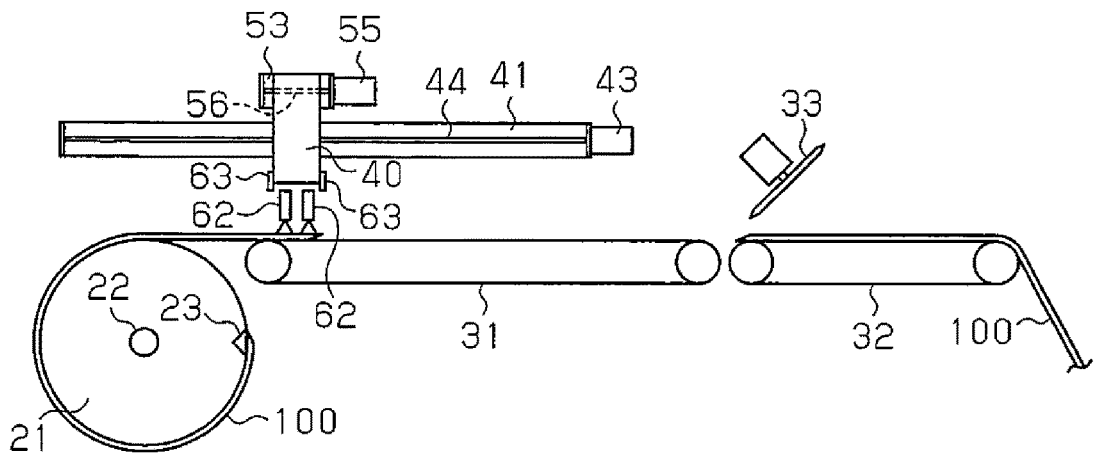
FIG. 9 is a schematic view representing a filler winding step following the step of FIG. 8.
Figure 10:
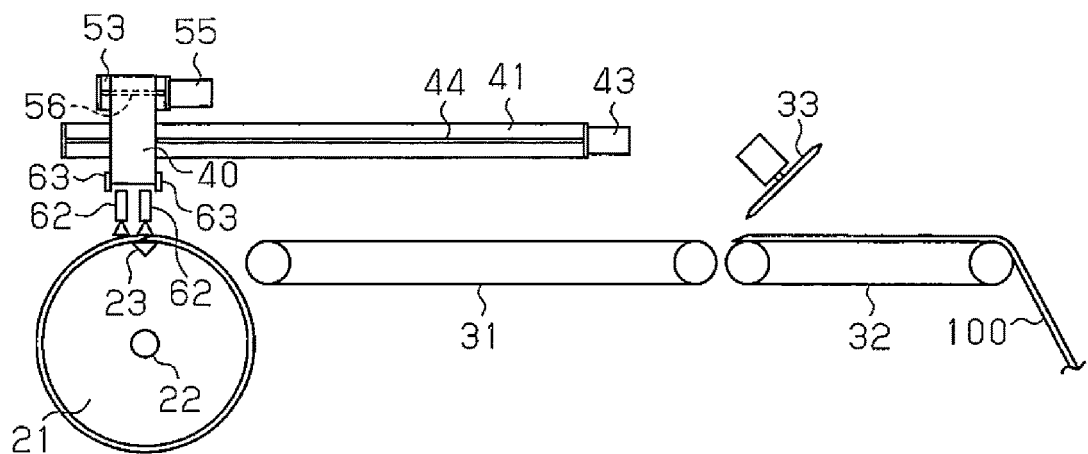
FIG. 10 is a schematic view representing a filler winding step following the step of FIG. 9.

Next, when the right-side sensor 63 detects the finishing end of the rubber strip 100, the third movable body 50 is lowered through rotation of the feed screw 52, as illustrated in FIG. 9. The two suckers 62 thus come into contact with the side surface of the top portion of the rubber strip 100. Drawing operation of the suckers 62 is then started to hold the top portion of the rubber strip 100 by means of the suckers 62. At this stage, the second movable body 46 is fixed at the raised position and the suckers 61 are held each at a position spaced upward from the base portion of the rubber strip 100.

Winding of the rubber strip 100 by the molding drum 21 and transport by the first conveyor 31 are carried out continuously. In this case, the feed screw 56 is rotated through actuation of the motor 55 to move the fourth movable body 54 by a certain stroke in the direction opposite to the transport direction. As a result, with reference to FIG. 1, the top portion of the rubber strip 100 is extended in the longitudinal direction of the rubber strip 100. This compensates for the length by which the top portion has been retracted after extrusion, which is represented by the long dashed double-short dashed lines in FIG. 1. The amount by which the rubber strip 100 is extended is determined in advance.

After the top portion of the rubber strip 100 is extended, the rubber strip 100 is transported while being maintained in a state held by the suckers 62. Then, with reference to FIG. 10, the finishing end of the rubber strip 100 reaches the position above the drawing portion 23 of the molding drum 21. Afterwards, drawing operation by the suckers 62 is stopped and the fourth movable body 54 is returned to the original position through rotation of the feed screw 56. Meanwhile, the third movable body 50 is returned to the upper position. Then, at the drawing portion 23 of the molding drum 21, the starting end and the finishing end of the rubber strip 100 are joined to each other manually or using a joint device. The rubber strip 100 is thus molded in an annular shape and the filler 101 is completed.

In this case, retraction of the top portion of the rubber strip 100 is restrained. This allows appropriate joint between the two ends of the rubber strip 100 without forming a gap or causing insufficient joint between the ends of the rubber strip 100. After the filler 101 is molded, the outer diameter of the molding drum 21 is decreased to separate the filler 101 from the molding drum 21. The filler 101 is then sent to a subsequent step for manufacturing a tire.

Accordingly, the present embodiment has the advantages described below.

Retraction of the top portion of the rubber strip 100 is restrained. The filler 101, which is highly accurate and has an annular shape, is thus obtained.

To restrain decrease of the length of the rubber strip 100, the movable body unit 40, which transports the rubber strip 100 together with the first conveyor 31, is used as a mechanism for extending the rubber strip 100. A mechanism used exclusively to extend the rubber strip 100 is thus unnecessary. This simplifies the configuration of the device.

The illustrated embodiment is not restricted to the above-described embodiment but may be modified to the form described below.

A single sensor may be employed to detect an end section of the rubber strip 100.

A sensor for detecting an end section of the rubber strip 100 does not necessarily have to be employed. In this case, the positions of the movable body unit 40 and the rubber strip 100 relative to each other are determined based on the rotation amount of the motor actuated to transport the rubber strip 100. The rubber strip 100 is then extended.

In the illustrated embodiment, the finishing end of the rubber strip 100 is extended. Instead, either the two ends or the starting end of the rubber strip 100 may be extended. If the starting end of the rubber strip 100 is extended solely or together with the finishing end, extension of the rubber strip 100 is carried out before the starting end of the rubber strip 100 reaches a position above the molding drum 21.

DESCRIPTION OF THE REFERENCE NUMERALS

21 . . . Molding Drum, 31 . . . First Conveyor, 32 . . . Second Conveyor, 40 . . . Movable Body Unit, 61 . . . Sucker, 62 . . . Sucker, 63 . . . Sensor, 100 . . . Rubber Strip, 101 . . . Filler

The invention claimed is:

1. A winding method for a bead filler for a tire including winding a rubber strip of a predetermined length in an annular shape and joining opposite ends of the rubber strip to each other,
    wherein, the rubber strip has a flattened triangular cross section,
    a thickest section of the rubber strip corresponds to a base portion and a thinnest section of the rubber strip corresponds to a top portion, and
    prior to the opposite ends of the rubber strip contacting one another, in at least one of the opposite ends of the rubber strip, the top portion is extended without an extension of the base portion.

2. The winding method for the bead filler for the tire according to claim 1,
    wherein one of the opposite ends of the rubber strip is held by being drawn, the held end section of the rubber strip being pulled and extended in a direction opposite to a transport direction of the rubber strip.

3. The winding method for the bead filler for the tire according to claim 2,
    wherein the rubber strip is transported to a molding drum by a conveyor, a starting end of the rubber strip being drawn by a drawing member and then moved from the conveyor onto an outer peripheral surface of the molding drum before drawing is stopped, the rubber strip being then wound around the outer peripheral surface of the molding drum in an annular shape, the drawing member being returned to an upstream side in the transport direction of the rubber strip such that a finishing end of the rubber strip is drawn by the drawing member before winding of the rubber strip is ended, the rubber strip being extended in this state.

* * * * *